(12) United States Patent
Chen (10) Patent No.: US 10,795,113 B2
(45) Date of Patent: Oct. 6, 2020

(54) DEVICE AND APPARATUS FOR IMAGING

(71) Applicant: Lenovo (Beijing) Limited, Beijing (CN)

(72) Inventor: Jiefeng Chen, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 310 days.

(21) Appl. No.: 15/082,192

(22) Filed: Mar. 28, 2016

(65) Prior Publication Data

US 2017/0184807 A1    Jun. 29, 2017

(30) Foreign Application Priority Data

Dec. 28, 2015    (CN) .......................... 2015 1 1001221

(51) Int. Cl.
| | |
|---|---|
| G02B 7/04 | (2006.01) |
| G02B 13/00 | (2006.01) |
| G02B 26/08 | (2006.01) |
| G02B 7/02 | (2006.01) |
| H04N 5/225 | (2006.01) |
| H04M 1/02 | (2006.01) |

(52) U.S. Cl.
CPC .............. *G02B 7/04* (2013.01); *G02B 7/021* (2013.01); *G02B 7/023* (2013.01); *G02B 13/0015* (2013.01); *G02B 13/0055* (2013.01); *G02B 26/0891* (2013.01); *H04N 5/2254* (2013.01); *H04M 1/0264* (2013.01)

(58) Field of Classification Search
CPC ... G02B 7/04; G02B 7/06; G02B 7/08; G02B 7/09; G02B 7/10; G02B 7/102; G02B 7/105; G02B 7/021; H04N 5/2254; H04M 1/0264

USPC ................... 359/720, 557, 684, 676
See application file for complete search history.

(56) References Cited

U.S. PATENT DOCUMENTS

| | | | |
|---|---|---|---|
| 4,630,902 A * | 12/1986 | Mochizuki | ........... G02B 3/0081 359/432 |
| 4,925,281 A | 5/1990 | Baker | |
| 2007/0177046 A1* | 8/2007 | Makii | ...................... G02B 7/08 348/335 |
| 2008/0246933 A1* | 10/2008 | Uchikawa | ........... G03F 7/70883 355/52 |
| 2013/0070339 A1* | 3/2013 | Pretorius | ................ G02B 27/64 359/557 |

FOREIGN PATENT DOCUMENTS

| CN | 101980067 A | 2/2011 |
|---|---|---|
| CN | 103323936 A | 9/2013 |
| CN | 103988109 A | 8/2014 |

* cited by examiner

*Primary Examiner* — Travis S Fissel
(74) *Attorney, Agent, or Firm* — Kunzler Bean & Adamson (57) ABSTRACT

An imaging device, an imaging apparatus, and an electronic device for imaging are disclosed. The imaging device includes an imaging sensor that operatively captures an image along an optical axis. The imaging device also includes a lens assembly, and the lens assembly includes a first lens and a second lens. The first lens and the second lens at least partially overlap each other in a first direction parallel to the optical axis. The lens holder operatively adjusts a relative arrangement between the first and second lens to focus the image on the imaging sensor.

17 Claims, 4 Drawing Sheets

DEVICE AND APPARATUS FOR IMAGING

FIELD

The subject matter disclosed herein involve imaging, and more specifically, devices and apparatuses for imaging.

BACKGROUND

Currently, cameras have become a necessary component for smart mobile devices. People can use the cameras inside their smart mobile devices to take photos anytime and anywhere.

However, with the constant generational renewal of smart mobile devices, people place higher and higher requirements on the functional parameters of the cameras. The resolution of the camera is usually related to the size of the camera lens inside the camera, and the focusing accuracy is related to the number of lenses. The more lenses a camera lens has, the bigger the size is, and the stronger the function of the camera will be. However, the size of existing smart mobile devices is limited, if the size of the camera is too big, it will certainly affect the layout and structure of other components inside the mobile device and it will also cause the size of the mobile device itself to be too big. Of course, if the quantity and size of lenses inside a camera are reduced, the clarity of the photos taken will be affected.

SUMMARY

One embodiment of the present disclosure includes an imaging device having an imaging sensor that operatively captures an image along an optical axis. The imaging device also includes a lens assembly having a first lens and a second lens. The imaging device includes a lens holder for holding the lens assembly. The first lens and the second lens at least partially overlap each other in a first direction parallel to the optical axis. Furthermore, the lens holder operatively adjusts a relative arrangement between the first and second lens to focus the image on the imaging sensor.

Another embodiment of the present disclosure includes an imaging apparatus. The imaging apparatus includes an imaging sensor that operatively captures an image along an optical axis. The imaging apparatus also includes a lens assembly having a first lens and a second lens. The first and second lens at least partially overlap each other in a first direction parallel to the optical axis. The imaging apparatus includes a moving apparatus that controls at least one of the first lens and the second lens to move so that the first lens or the second lens are movable along the first direction parallel to the optical axis and/or a second direction perpendicular to the optical axis.

One embodiment of the present disclosure includes an electronic device. The electronic device includes an imaging apparatus. The imaging apparatus includes an imaging sensor that operatively captures an image along an optical axis, a lens assembly having a first lens and a second lens, and a lens holder for holding the lens assembly. The first and second lens at least partially overlap each other in a first direction parallel to the optical axis, and the lens holder operatively adjusts a relative arrangement between the first and second lens to focus the image on the imaging sensor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Preferred embodiments of the present disclosure are described below in detail with reference to the accompanying drawings. Please note that in the specification and the accompanying drawings, the steps and elements that are essentially the same in the present disclosure are marked in the same way in the accompanying drawings, and repetitive explanations for these steps and elements will be omitted.

Figure 1A:
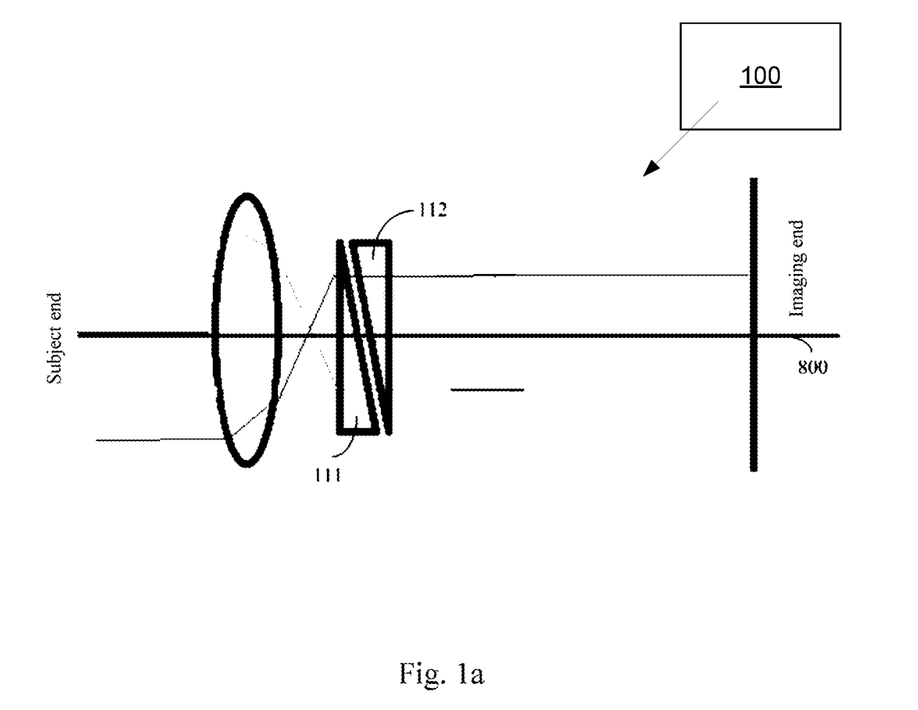
FIGS. 1a to 1b are schematic structure diagrams of the camera lens according to Embodiment 1 of the present disclosure.
Figure 1B:
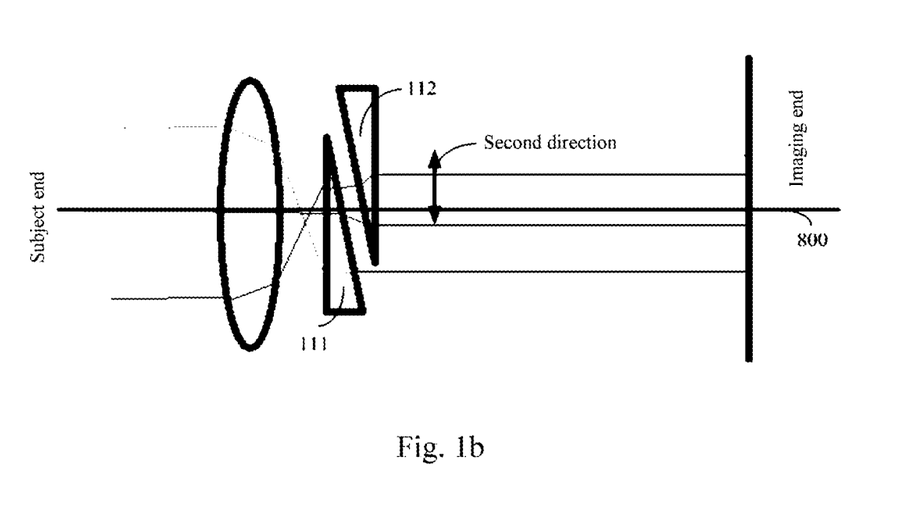

FIGS. 1a to 1b are schematic structure diagrams of the camera lens according to Embodiment 1 of the present disclosure. The following is a description of the camera lens of Embodiment 1 of the present disclosure in reference to FIGS. 1a to 1b. As shown in FIGS. 1a to 1b, an imaging device 100 includes an imaging sensor (not shown) that operatively captures an image along an optical axis, a first lens assembly, the first lens assembly includes a first lens 111 and a second lens 112, and a lens holder (not shown) for holding the first lens assembly. In FIGS. 1a to 1b, the subject end is on the left side and the imaging end is on the right side; the light enters the camera lens through the subject end and an image is formed through a photosensitive element of the imaging end. An optical axis 800 is a central line of a light beam from the subject end, and it is also a symmetrical axis of an optical system formed by optical components in the lens. In the embodiment of the present disclosure, the direction parallel to the optical axis 800 is referred to as the first direction (the left-right direction in the drawing), and the direction perpendicular to the optical axis 800 is referred to as the second direction (the top-bottom direction in the drawing).

According to one example of the present disclosure, a first lens 111 and a second lens 112 fully or partially overlap along the first direction, as shown in FIGS. 1a-1b. For example, in FIG. 1a, the first lens 111 and the second lens 112 fully overlap in the first direction. For example, when a picture of a scene with infinite distance is taken, the first lens 111 and the second lens 112 can fully overlap in the first direction. In FIG. 1b, the first lens 111 and the second lens 112 can partially overlap in the first direction. For example, when a picture of an object is taken at a near distance, the first lens 111 and the second lens 112 can partially overlap to adjust the optical path so that the image is formed at the imaging end.

In order to achieve the lens focusing, at least one of the first lens 111 and the second lens 112 can move along the second direction perpendicular to the optical axis to change the optical path. For example, if the first lens 111 does not move, the second lens 112 can move along the second direction; as seen in FIG. 1b, the second lens 112 can move upward or downward in a direction perpendicular to the optical axis 800. Alternatively, if the second lens 112 does not move, the first lens 111 can move along the second direction; as seen in FIG. 1b, the first lens 111 can move upward or downward in a direction perpendicular to the optical axis 800. Alternatively, the first lens 111 and the second lens 112 separately move along the second direction, wherein one of them moves upward in a direction perpendicular to the optical axis 800 and the other one moves downward in a direction perpendicular to the optical axis 800. Optionally, the first lens 111 and the second lens 112 can move at the same time and can also move at different times.

According to one example of the present disclosure, the first lens 111 and the second lens 112 can simultaneously move along the second direction, with one of them moving upward in a direction perpendicular to the optical axis 800 and the other one moving downward in a direction perpendicular to the optical axis 800.

According to one example of the present disclosure, when the first lens 111 is a convex lens, the second lens 112 is a concave lens; and when the first lens 111 is a concave lens, the second lens 112 is a convex lens.

In the above-mentioned embodiment of the present disclosure, the lenses inside the camera lens overlap in the direction parallel to the optical axis and can move along the direction perpendicular to the optical axis to achieve the focusing function. When taking a picture with a mobile device that has this kind of camera lens, the lenses inside the camera lens can laterally move in the direction parallel to the main screen of the mobile phone. Compared to the front-back movement of existing technologies, this can effectively reduce the dimensions of the camera lens and reduce the thickness of the mobile device, while still facilitating the function of focusing.

Figure 2:
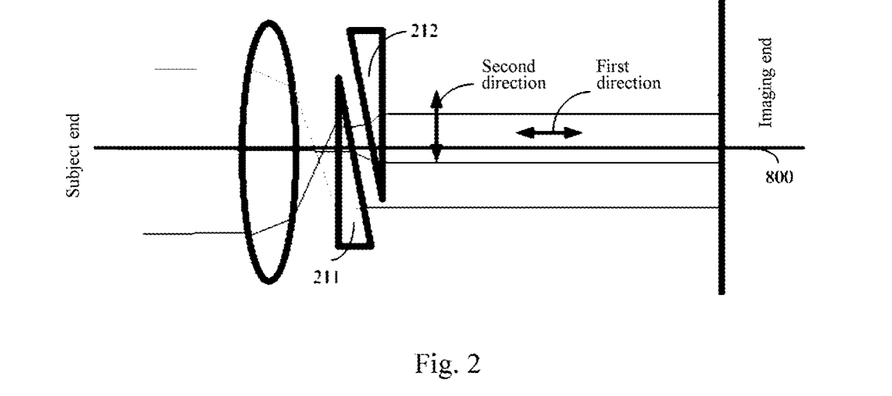
FIG. 2 is a schematic structure diagram of the camera lens according to Embodiment 2 of the present disclosure.

FIG. 2 is a schematic structure diagram of the camera lens according to Embodiment 2 of the present disclosure. The camera lens 200 of Embodiment 2 of the present disclosure is introduced below with reference to FIG. 2. The difference between camera lens 200 and the other camera lens 100 is: the camera lens 200 has all the functions and structures of the camera lens 100, it further includes a first lens 211 and a second lens 212 that can move in a first direction. To keep the conciseness of the specification, the portions that are identical to those of camera lens 100 will be only briefly described.

As shown in FIG. 2, the camera lens 200 includes a first lens assembly, the first lens assembly includes a first lens 211 and a second lens 212. In FIG. 2, the subject end is on the left side, and the imaging end is on the right side; the light enters the camera lens through the subject end and an image is formed through a photosensitive element of the imaging end. An optical axis 800 is the central line of a light beam from the subject end, and it is also a symmetrical axis of an optical system formed by optical components of the lens. In the embodiment of the present disclosure, the direction parallel to the optical axis 800 is referred to as the first direction (the left-right direction in the drawing), and the direction perpendicular to the optical axis 800 is referred to as the second direction (the top-bottom direction in the drawing). According to one example of the present disclosure, the first lens 211 and the second lens 212 fully or partially overlap along the second direction, as shown in FIG. 2. For example, when a picture of a scene with infinite distance is taken, the first lens 211 and the second lens 212 can fully overlap; and when a picture of an object is taken at a near distance, the first lens 211 and the second lens 212 partially overlap to adjust the optical path so that the image is formed at the imaging end.

In order to achieve camera lens focusing, at least one of the first lens 211 and the second lens 212 can move along the second direction perpendicular to the optical axis to change the optical path. For example, if the first lens 211 does not move, the second lens 212 can move along the second direction; as seen in FIG. 2, the second lens 212 can move upward or downward in a direction perpendicular to the optical axis 800. Alternatively, if the second lens 212 does not move, the first lens 211 can move along the second direction; as seen in FIG. 2, the first lens 111 can move upward or downward in a direction perpendicular to the optical axis 800. Alternatively, the first lens 211 and the second lens 212 can separately move along the second direction, with one of them moving upward in a direction perpendicular to the optical axis 800 and the other one moving downward in a direction perpendicular to the optical axis 800. According to one example of the present disclosure, the first lens 211 and the second lens 212 can simultaneously move along the second direction, with one of them moving upward in a direction perpendicular to the optical axis 800 and the other one moving downward in a direction perpendicular to the optical axis 800.

Additionally, according to one example of the present disclosure, at least one of either the first lens 211 or the second lens 212 can move along the second direction and can also move along the first direction. In reference to FIG. 2, if the first lens 211 does not move, the second lens 212 can move to the left or right along the direction parallel to the optical axis 800. Alternatively, if the second lens 212 does not move, the first lens 211 can move along the first direction; as seen in FIG. 2, the first lens 211 can move to the left or right along the direction parallel to the optical axis 800. Alternatively, the first lens 211 and the second lens 212 can separately move along the first direction, with one of them moving to the left along the direction of the optical axis 800 and the other one moving to the right along the direction of the optical axis 800. Optionally, the first lens 211 and the second lens 212 can simultaneously move along the first direction, with one of them moving to the left along the direction of the optical axis 800 and the other one moving to the right along the direction of the optical axis 800.

According to one example of the present disclosure, when the first lens 211 is a convex lens, the second lens 212 is a concave lens; and when the first lens 211 is a concave lens, the second lens 212 is a convex lens.

In the above-mentioned embodiment of the present disclosure, the lenses in the camera lens overlap in the direction parallel to the optical axis. Also, they not only can move along the direction perpendicular to the optical axis, but can also move along the direction parallel to the optical axis to achieve multi-angle, all-directional focusing. This increases the accuracy of the focusing operation, and in the meantime, because the lens is able to move in the direction perpendicular to the optical axis, the size of the camera lens can be reduced and the thickness of the mobile device using the lens can also be reduced.

Figure 3:
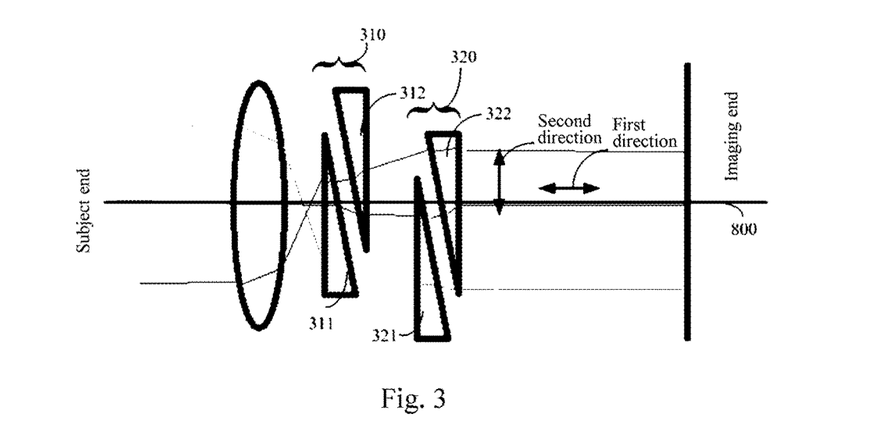
FIG. 3 is a schematic structure diagram of the camera lens according to Embodiment 3 of the present disclosure.

FIG. 3 is a schematic structure diagram of the camera lens according to Embodiment 3 of the present disclosure. The camera lens 300 of Embodiment 3 of the present disclosure is introduced below, with reference to FIG. 3. On the basis of camera lens 100 or camera lens 200, the camera lens 300 adds a second lens assembly. To keep the conciseness of the specification, the portions that are identical to those of camera lens 100 or camera lens 200 will be only briefly described.

In reference to FIG. 3, the camera lens 300 includes a first lens assembly 310 and a second lens assembly 320; the first lens assembly 310 includes a first lens 311 and a second lens 312. In FIG. 3, the subject end is on the left side, and the imaging end is on the right side; the light enters the camera lens through the subject end, and an image is formed through a photosensitive element of the imaging end. An optical axis 800 is the central line of a light beam from subject end, and it is also a symmetrical axis of an optical system formed by optical components of the camera lens. In the embodiment of the present disclosure, the direction parallel to the optical axis 800 is referred to as the first direction (the left-right direction in the drawing), and the direction perpendicular to the optical axis 800 is referred to as the second direction (the top-bottom direction in the drawing). According to one example of the present disclosure, the first lens 311 and the second lens 312 fully or partially overlap along the second direction, as shown in FIG. 3. For example, when a picture of a scene with infinite distance is taken, the first lens 311 and the second lens 312 can fully overlap; and a picture of an object is taken at a near distance, the first lens 311 and the second lens 312 partially overlap to adjust the optical path so that the image is formed at the imaging end.

In order to achieve camera lens focusing, at least one of either the first lens 311 and the second lens 312 can move along the second direction perpendicular to the optical axis to change the optical path. For example, if the first lens 311 does not move, the second lens 312 can move along the second direction; as seen in FIG. 3, the second lens 312 can move upward or downward in a direction perpendicular to the optical axis 800. Alternatively, if the second lens 312 does not move, the first lens 311 can move along the second direction; as seen in FIG. 3, the first lens 311 can move upward or downward in a direction perpendicular to the optical axis 800. Alternatively, the first lens 311 and the second lens 312 can separately move along the second direction, with one of them moving upward in a direction perpendicular to the optical axis 800 and the other one moving downward in a direction perpendicular to the optical axis 800. According to one example of the present disclosure, the first lens 311 and the second lens 312 can simultaneously move along the second direction, with one of them moving upward in a direction perpendicular to the optical axis 800 and the other one moving downward in a direction perpendicular to the optical axis 800.

Additionally, according to one example of the present disclosure, at least one of the first lens 311 and the second lens 312 can move along the second direction and can also move along the first direction. In reference to FIG. 3, if the first lens 311 does not move, the second lens 312 can move to the left or right parallel to the optical axis 800. Alternatively, if the second lens 312 does not move, the first lens 311 can move along the first direction; as seen in FIG. 3, the first lens 311 can move to the left or right in a direction parallel to the optical axis 800. Alternatively, the first lens 311 and the second lens 312 can separately move along the first direction, with one of them moving to the left in the direction along the optical axis 800 and the other one moving to the right in the direction along the optical axis 800. Optionally, the first lens 311 and the second lens 312 can simultaneously move along the first direction, with one of them moving to the left in the direction along the optical axis 800 and the other one moving to the right in the direction along the optical axis 800.

According to one example of the present disclosure, when the first lens 311 is a convex lens, the second lens 312 is a concave lens; and when the first lens 311 is a concave lens, the second lens 312 is a convex lens.

Additionally, according to one example of the present, in reference to FIG. 3, the second lens assembly 320 includes a third lens 321. The third lens 321 can move along the first direction parallel to the optical axis 800 or can move along the second direction perpendicular to the optical axis 800. Alternatively, the third lens 321 can move in the first direction and can also move in the second direction. The third lens 321 can be a convex lens, or it can be a concave lens.

Additionally, based on another example of the embodiment of the present disclosure, the second lens assembly 320 further includes a fourth lens 322. The fourth lens 322 can move in the first direction parallel to the optical axis 800 or can move in the second direction perpendicular to the optical axis 800. Alternatively, the fourth lens 322 can move in the first direction and can also move in the second direction. According to an example of the present disclosure, the third lens 321 and the fourth lens 322 can separately move along the second direction, and the movement directions are opposite to each other. For example, in FIG. 3, the third lens 321 and the fourth lens 322 can simultaneously move along the second direction, with one moving in an upward direction perpendicular to the optical axis 800 and the other moving in a downward direction perpendicular to the optical axis 800. Based on another example of the present disclosure, the third lens 321 and the fourth lens 322 can separately move along the first direction, and the movement directions are opposite to each other. For example, in FIG. 3, the third lens 321 and the fourth lens 322 can move simultaneously, with one moving to the left in a direction parallel to the optical axis 800 and the other moving to the right in a direction parallel to the optical axis 800.

Additionally, the fourth lens 322 can be a convex lens, or it can be a concave lens. According to one example of the present disclosure, when the third lens 321 is a convex lens, the fourth lens 322 is a concave lens; and when the third lens 321 is a concave lens, the fourth lens 322 is a convex lens.

Although the above only describes camera lenses with two lens assemblies, the present disclosure is not limited to only two assemblies. For example, among the embodiments of the present disclosure, the camera lens could also have more than two lens assemblies.

In the above-mentioned embodiment of the present disclosure, the camera lens has multiple lens assemblies, and not only can every lens of each lens assembly move along the direction perpendicular to the optical axis, but can also move along the direction parallel to the optical axis to achieve multi-angle, all-directional focusing. This increases the accuracy of the focusing operation, while effectively reducing the size of the camera lens to adapt to the size of the mobile device.

Figure 4:
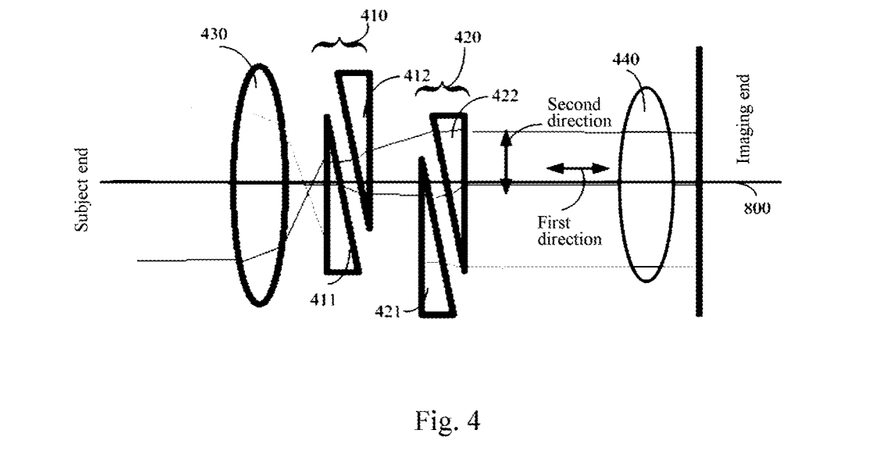
FIG. 4 is a schematic structure diagram of the camera lens according to Embodiment 4 of the present disclosure.

FIG. 4 is the schematic structure diagram of the camera lens according to Embodiment 4 of the present disclosure. In Embodiment 4 of the present disclosure, on the basis of any camera lens of the above-mentioned Embodiments 1 to 3, the camera lens 400 not only includes a first lens assembly 410 and/or a second lens assembly 420, but also includes a third lens assembly 430. The first lens assembly 410 and the second lens assembly 420 are the same as those in the above three embodiments, so only the third lens assembly 430 is introduced in detail below.

According to an example of the present disclosure, the third lens assembly 430 is closer to the subject end on the first direction parallel to the optical axis 800 in relation to the first lens assembly 410 and/or the second lens assembly 420. For example, as shown in FIG. 4, the third lens assembly 430 is the closest to the subject end, followed by the first lens assembly 410 and the second lens assembly 420. Additionally, the third lens assembly 430 can be a convex lens used for convergence of light entering the lens.

According to an example of the present disclosure, the lens 400 includes a fourth lens assembly 440. The fourth lens assembly 440 is closer to the imaging end on the first direction parallel to the optical axis in relation to the first lens assembly 410 and/or the second lens assembly 420. For example, as shown in FIG. 4, the fourth lens assembly 440 is the closest to the imaging end, followed by the second lens assembly 420 and the first lens assembly 410. Additionally, the fourth lens assembly 440 can be a concave lens or a flat lens so that the light transmitted through it is emitted divergently or flatly in order to make sure the light in the optical path is transmitted to the photosensitive component for imaging.

According to an example of the present disclosure, the third lens assembly 430 and/or the fourth lens assembly 440 can move along the first direction parallel to the optical axis 800 relative to the first lens assembly 410 and/or the second lens assembly 420. For example, as shown in FIG. 4, the third lens assembly 430 can move to the left or right along the direction parallel to the optical axis 800, and the fourth lens assembly 440 can also move to the left or right along the direction parallel to the optical axis 800.

The embodiment of the present disclosure can make the light beam diverge or converge at appropriate times by using the third lens assembly 430 closer to the subject end and the second lens assembly 420 closer to the imaging end, so as to facilitate the focusing accuracy and an increase in image clarity.

Figure 5A:
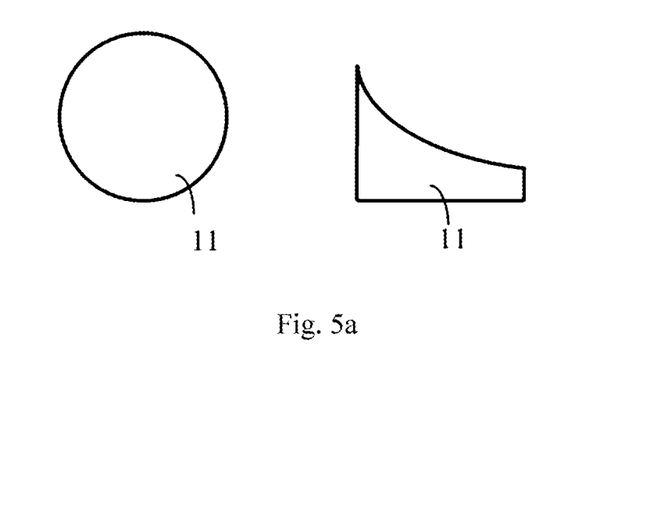
FIGS. 5a to 5b are schematic drawings of the lens shapes according to Embodiment 5 of the present disclosure.
Figure 5B:
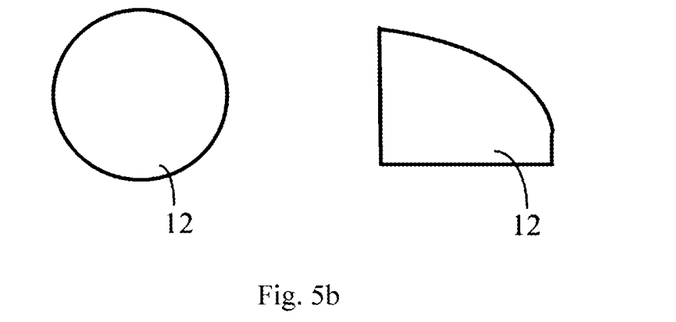

FIGS. 5a and 5b are schematic drawings of the lens shapes according to Embodiment 5 of the present disclosure. The structure and shape of the first lens 11, as shown in FIGS. 5a and 5b, can be applied to the first lenses of camera lens 100 to camera lens 400 in the above-mentioned Embodiments 1 to 4. The structure and shape of the second lens 12 can be applied to the second lenses of camera lens 100 to camera lens 400 in the above-mentioned Embodiments 1 to 4. Additionally, the structure and shape of the first lens 11 can be applied to the third lenses of camera lens 300 and camera lens 400 in the above-mentioned Embodiments 3 and 4. The structure and shape of the second lens 12 can be applied to the fourth lenses of camera lens 300 and camera lens 400 in the above-mentioned Embodiments 3 and 4.

In reference to FIG. 5a, the first lens 11 can be a concave lens. The front view of the first lens 11 is shown on the left of FIG. 5a, and the side view of the first lens 11 is shown on the right of FIG. 5a. In reference to FIG. 5b, the second lens 12 can be a convex lens. The front view of the second lens 12 is shown on the left of FIG. 5b, and the side view of the second lens 12 is shown on the right of FIG. 5b. According to an example of the present disclosure, the first lens 11 is closer to the subject end, and the second lens 12 is closer to the imaging end. Alternatively, the second lens 12 can be closer to the subject end, and the first lens 11 can be closer to the imaging end.

According to an example of the present disclosure, when the camera lens is focusing, the first lens 11 and the second lens 12 work together to complete the focusing operation. For example, one of the first lens 11 and the second lens 12 is a convex lens and the other is a concave lens. Furthermore, one has a thickness that tapers from the top to the bottom in the second direction perpendicular to the optical axis 800, and the other has a thickness that tapers from the bottom to the top in the second direction perpendicular to the optical axis 800. This allows the light to converge through the convex lens and diverge through the concave lens. The light's refractive index is different depending on the different focal distances of convex lenses of different thicknesses. Also, the different focal distances of concave lenses of different thicknesses have different influences on the diverging ability of light. Therefore, the above-mentioned design of the shapes of the first lens 11 and the second lens 12 can change the direction of the optical path using multiple angles to focus the light rays, thus allowing for the obtainment of a clear image at the imaging end. Similarly, the third lens and the fourth lens also work together. For example, one of the third lens and the fourth lens has a thickness that tapers from the top to the bottom in the second direction perpendicular to the optical axis 800, and the other has a thickness that tapers from the bottom to the top in the second direction perpendicular to the optical axis 800.

The first lens and the second lens of the embodiment of the present disclosure, due to the unique design of their shapes, can allow them to effectively diverge or converge light to thereby raise the focusing efficiency and accuracy.

According to Embodiment 6 of the present disclosure, an imaging apparatus is provided, the imaging apparatus includes the camera lens of the above-mentioned Embodiments 1 to 5. Additionally, the imaging apparatus of Embodiment 6 also includes a lens holder (shown in the form of a moving apparatus). The moving apparatus can make (e.g., control) at least one of the first lens and the second lens of the above-mentioned camera lens move so that the first lens or the second lens can move along the first direction and/or the second direction. Alternatively, it can make at least one of the third lens and the fourth lens of the above-mentioned camera lens move so that the third lens or the fourth lens can move along the first direction and/or the second direction.

Figure 6A:
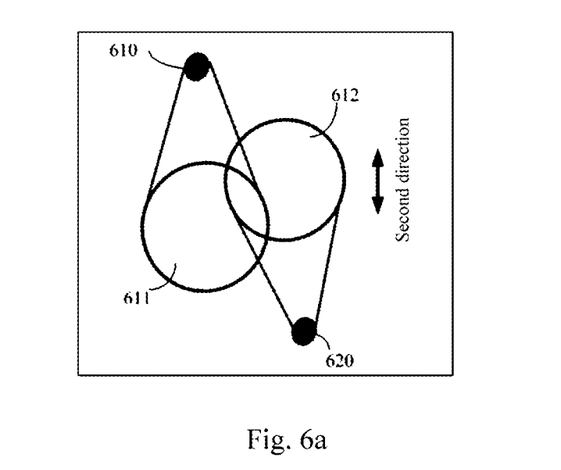
FIGS. 6a to 6c are schematic structure diagrams of the moving apparatus inside the imaging apparatus according to Embodiment 6 of the present disclosure.

FIG. 6 is a schematic structure diagram of the movement apparatus inside the imaging apparatus according to Embodiment 6 of the present disclosure. In reference to FIG. 6a, the moving apparatus 600 includes a shaft 610 and a shaft 620. When the first lens 611 and the second lens 612 are placed into the moving apparatus 600, the shaft 610 and the shaft 620 can move the first lens 610 and the second lens 612 along the second direction perpendicular to the optical axis. Optionally, the first lens 611 and the second lens 612 can move independently and can also move simultaneously.

Figure 6B:
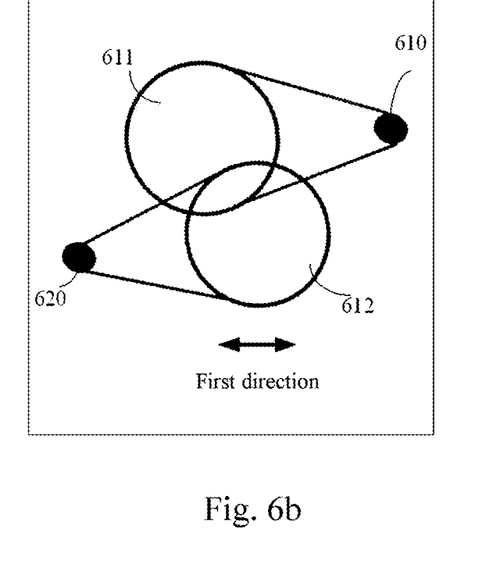

In reference to FIG. 6b, the shaft 610 and the shaft 620 can also move the first lens 611 and the second lens 612 along the first direction parallel to the optical axis. Optionally, the first lens 611 and the second lens 612 can move independently and can also move simultaneously.

According to one example of the present disclosure, the shaft 610 and the shaft 620 can simultaneously make the first lens and the second lens move separately in two opposite directions along the first direction or the second direction.

According to another example of the present disclosure, the shaft 610 and the shaft 620 can also simultaneously make the first lens and the second lens move along the first direction or the second direction. For example, they can be moved in the direction of the diagonal line of the first direction and the second direction. For example, the first lens 611 and the second lens 612 can be simultaneously moved along the first direction and the second direction so that they become apart from each other. Alternatively, the first lens 611 and the second lens 612 can be simultaneously moved along the first direction and the second direction so that they become closer to each other.

Figure 6C:
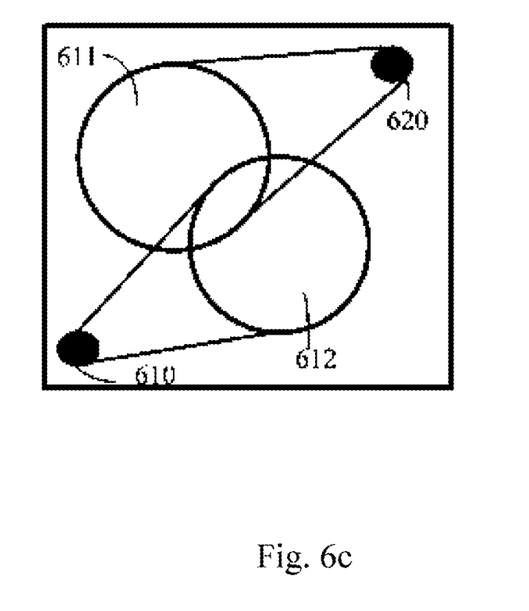

FIG. 6c is an example of the first lens 611 and the second lens 612 moving in the direction of the diagonal line of the first direction and the second direction. In reference to FIG. 6c, the moving apparatus 600 includes the shaft 610 and the shaft 620. When the first lens 611 and the second lens 612 are placed into the moving apparatus 600, the shaft 610 and the shaft 620 can move the first lens 611 and the second lens 612 along the direction of the connecting line of the two shafts.

According to an example of the present disclosure, when the camera lens has multiple lenses, for example, when it further includes a second lens assembly and when the second lens assembly includes a third lens and a fourth lens, the moving apparatus 600 can similarly make at least one of the third lens and the fourth lens move so that the third lens and/or the fourth lens move along the first direction and/or the second direction. This will not be explained in any further detail here.

In the embodiments of the present disclosure, the imaging apparatus includes the camera lens and the moving apparatus. The moving apparatus can make the lenses inside the camera lens move, facilitating the accuracy of the movement position to thereby raise the focusing efficiency and accuracy.

According to the seventh embodiment of the present disclosure, an electronic device is provided, including the camera lenses of the above-mentioned Embodiments 1 to 5 or the imaging apparatus of Embodiment 6. The specific form of the electronic device includes, but is not limited to, devices that have photographic or video capture functions such as mobile phones, personal computers, digital cameras, personal digital assistants, portable computers, and game devices.

In the embodiment of the present disclosure, when using the electronic device that has the camera lens or imaging apparatus of the above-mentioned embodiments, the lenses inside the camera lens can laterally move in a direction parallel to the main screen of the device. Compared to the front-back movement in a direction perpendicular to the main screen of existing technologies, this can effectively reduce the size of the camera lens and also reduce the thickness of the electronic device.

Those of ordinary skill in the art can understand how the elements and algorithm steps of the examples described in the embodiments publicized in this document can be realized through electronic hardware, computer software, or the combination of both. Furthermore, a software module can be configured within a computer memory media of any format. In the above specification, the components and steps of all examples have been generally described according to their functions for the sake of clearly illustrating the interchangeability of hardware and software configurations. Whether these functions are ultimately executed using hardware or software will be determined by the specific application and design constraints of the technical scheme. Those skilled in the art are capable of realizing the described functions using different methods for each specific application, but such realizations should not be considered as exceeding the scope of the present disclosure.

Those skilled in the art should understand that all types of revisions, combinations, partial combinations, and replacements can be made to the present disclosure depending on design needs and other factors as long as these fall within the scope of the appended claims and their equivalents.

What is claimed is:

1. An imaging device, comprising:
   an imaging sensor that operatively captures an image along an optical axis;
   a lens assembly comprising a first lens and a second lens, wherein the first lens is directly adjacent to the second lens such that a light beam passing through the first lens and the second lens is uninterrupted between the first lens and the second lens;
   a lens holder for holding the lens assembly;
   wherein:
   the first and second lens at least partially overlap each other in a first direction parallel to the optical axis;
   the lens holder operatively adjusts a relative arrangement between the first and second lens to focus the image on the imaging sensor;
   the first lens and the second lens are movable by the lens holder in the first direction parallel to the optical axis and a second direction perpendicular to the optical axis;
   the first lens and the second lens are movable independently from one another in the first direction and the second direction;
   one of the first lens and the second lens is a convex lens, and the other one is a concave lens; and
   the first lens and the second lens are not aspheric.

2. The imaging device of claim 1, wherein the first lens and the second lens are separately movable in the second direction perpendicular to the optical axis, and movement directions of the first lens and the second lens are opposite to each other.

3. The imaging device of claim 1, wherein the first lens and the second lens are separately movable in the first direction parallel to the optical axis, and movement directions of the first lens and the second lens are opposite to each other.

4. The imaging device of claim 1, wherein a thickness of at least one of the first lens and the second lens tapers from a top to a bottom in a second direction perpendicular to the optical axis, and a thickness of the other of the first lens and the second lens tapers from a bottom to a top in the second direction.

5. The imaging device of claim 1, further comprising a second lens assembly, the second lens assembly comprising a third lens, wherein the third lens is movable along the first direction parallel to the optical axis and/or movable along a second direction perpendicular to the optical axis.

6. The imaging device of claim 5, wherein the second lens assembly further comprises a fourth lens, the fourth lens movable along the first direction parallel to the optical axis and/or movable along the second direction perpendicular to the optical axis, wherein when the third lens is a convex lens, the fourth lens is a concave lens, and when the third lens is a concave lens, the fourth lens is a convex lens.

7. The imaging device of claim 6, wherein a thickness of one of the third lens and the fourth lens tapers from a top to a bottom in the second direction perpendicular to the optical axis, and a thickness of the other of the third lens and the fourth lens tapers from a bottom to a top in the second direction perpendicular to the optical axis.

8. The imaging device of claim 6, wherein the third lens and the fourth lens are separately movable along the second direction, and movement directions of the third lens and the fourth lens are opposite to each other.

9. The imaging device of claim 6, wherein the third lens and the fourth lens are separately movable along the first direction, and movement directions of the third lens and the fourth lens are opposite to each other.

10. The imaging device of claim 1, wherein the camera lens further comprises a third lens assembly, wherein the third lens assembly is closer to a subject end on the first direction parallel to the optical axis relative to the first lens assembly and/or the second lens assembly, and the third lens assembly comprises a convex lens.

11. The imaging device of claim 10, wherein the camera lens further comprises a fourth lens assembly, wherein the fourth lens assembly is closer to an imaging end on the first direction parallel to the optical axis relative to the first lens assembly and/or the second lens assembly, and the fourth lens assembly is a concave or flat lens.

12. The imaging device of claim 11, wherein the third lens assembly and/or the fourth lens assembly are movable along the first direction parallel to the optical axis relative to the first lens assembly and/or the second lens assembly.

13. An imaging apparatus, comprising:
an imaging sensor that operatively captures an image along an optical axis;
a lens assembly comprising a first lens and a second lens, wherein the first and second lens at least partially overlap each other in a first direction parallel to the optical axis, and the first lens is directly adjacent to the second lens such that a light beam passing through the first lens and the second lens is uninterrupted between the first lens and the second lens; and
a moving apparatus, wherein the moving apparatus controls the first lens and the second lens to move so that the first lens and the second lens are movable by the moving apparatus in the first direction parallel to the optical axis and a second direction perpendicular to the optical axis, and the first lens and the second lens are movable independently from one another in the first direction and the second direction;
wherein one of the first lens and the second lens is a convex lens, and the other one is a concave lens, and the first lens and the second lens are not aspheric.

14. The imaging apparatus of claim 13, wherein the moving apparatus controls the first lens and the second lens to move so that the first lens and the second lens move along the first direction and/or the second direction, and movement directions of the first lens and the second lens are opposite to each other.

15. The imaging apparatus of claim 13, wherein the moving apparatus controls at least one of a third lens and a fourth lens move so that the third lens and/or the fourth lens move along the first direction and/or the second direction.

16. The imaging apparatus of claim 15, wherein the moving apparatus controls the third lens and the fourth lens to move so that the third lens and the fourth lens move along the first direction and/or the second direction, and movement directions of the third lens and the fourth lens are opposite to each other.

17. An electronic device, comprising:
an imaging apparatus comprising:
an imaging sensor that operatively captures an image along an optical axis;
a lens assembly comprising a first lens and a second lens, wherein the first lens is directly adjacent to the second lens such that a light beam passing through the first lens and the second lens is uninterrupted between the first lens and the second lens; and
a lens holder for holding the lens assembly;
wherein:
the first and second lens at least partially overlap each other in a first direction parallel to the optical axis;
the lens holder operatively adjusts a relative arrangement between the first and second lens to focus the image on the imaging sensor;
the first lens and the second lens are movable by the lens holder in the first direction parallel to the optical axis and a second direction perpendicular to the optical axis;
the first lens and the second lens are movable independently from one another in the first direction and the second direction;
one of the first lens and the second lens is a convex lens, and the other one is a concave lens; and
the first lens and the second lens are not aspheric.

* * * * *